Figure 1:
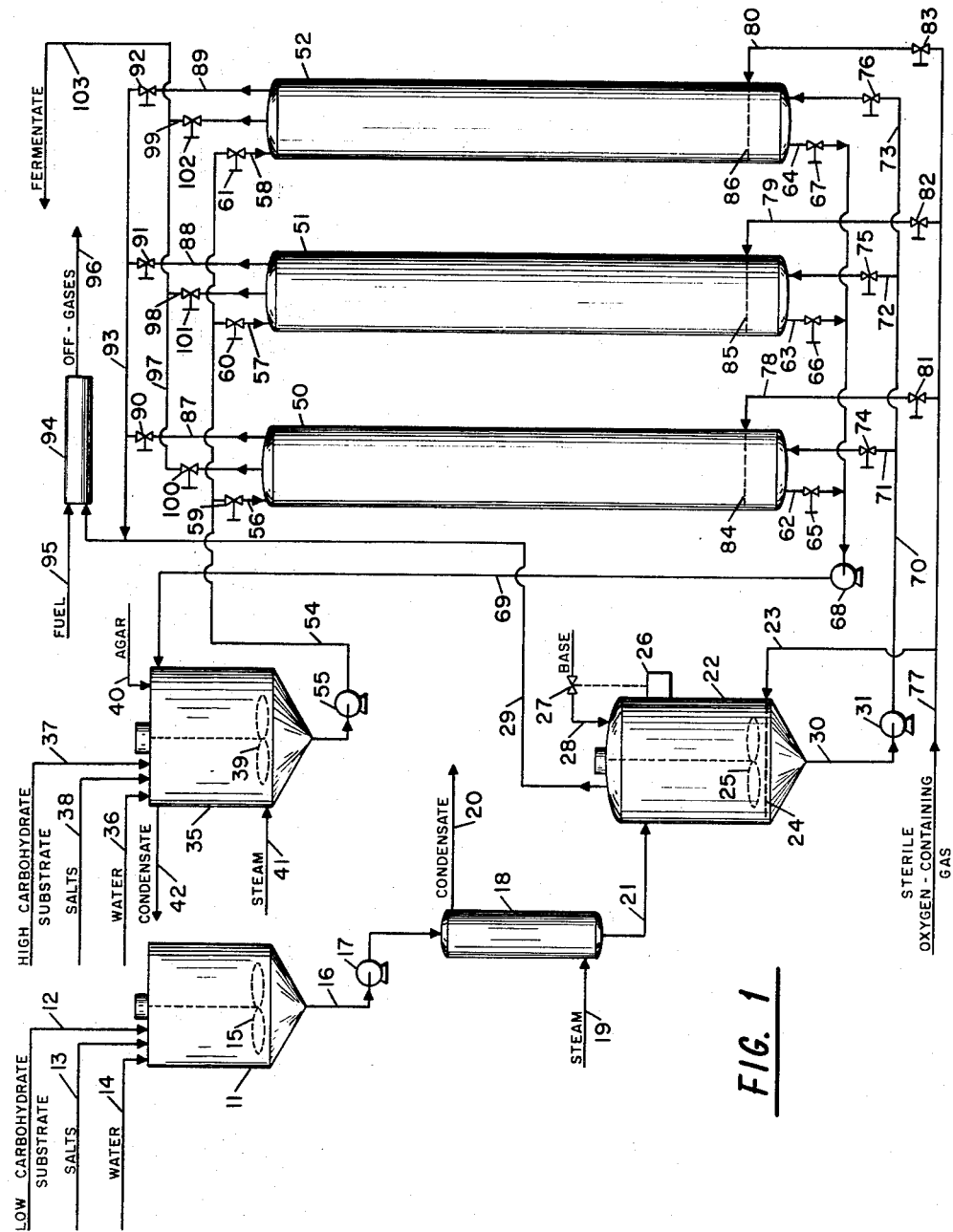

May 17, 1966  B. J. LIPPS, JR  3,251,749
FERMENTATION PROCESS FOR PREPARING POLYSACCHARIDES
Filed Nov. 5, 1963  2 Sheets-Sheet 1

Benjamin J. Lipps jr.
INVENTOR.

BY James E. Reed
ATTORNEY

Benjamin J. Lipps jr.
INVENTOR.

United States Patent Office 3,251,749
Patented May 17, 1966

3,251,749
FERMENTATION PROCESS FOR PREPARING POLYSACCHARIDES
Benjamin J. Lipps, Jr., Connersville, Ind., assignor, by mesne assignments, to Esso Production Research Company, Houston, Tex., a corporation of Delaware
Filed Nov. 5, 1963, Ser. No. 321,465
9 Claims. (Cl. 195—31)

The present invention relates to industrial fermentation and is particularly concerned with an improved fermentation process for the production of heteropolysaccharides and similar materials.

Polysaccharides, yeast, bacterial cells useful as food supplements, and similar materials are produced by the industrial fermentation of carbohydrates, hydrocarbons and similar substrates. The processes employed typically require the preparation of a sterile medium containing a suitable substrate, fermentation of the medium in stirred reactors under carefully controlled conditions, and subsequent separation and recovery of the fermentation product. Experience has shown that the concentration of the substrate in the medium must be kept low in many such processes to avoid detrimental effects on cell growth and maturation, that utilization of the substrate is often poor, that the yield of fermentation products per unit volume is generally low, and that the products are often recovered in very low concentrations. Efforts to minimize these and related difficulties and thus reduce fermentation costs have in the past been only partially successful.

The present invention provides a new and improved fermentation process which alleviates many of the difficulties that have characterized processes employed heretofore. In accordance with the invention, it has now been found that fermentation processes for the production of polysaccharides and similar materials wherein the composition of the medium must be controlled to avoid detrimental effects on cell growth and maturation can be readily carried out by contacting a culture containing selected microoragnisms with particulate solids or other supporting materials from which the substrate utilized by the microorganisms diffuses or dissolves at a controlled rate. Experimental work has shown that the use of such a system generally permits higher fermentation rates per unit volume, often results in more efficient utilization of the substrate, may make possible higher final concentrations of the fermentation product, and normally permits better control of the residence time than can be obtained in stirred reactors and similar equipment. These advantages often make possible susbtantial savings in the cost of carrying out the fermentation reactions.

Figure 2:
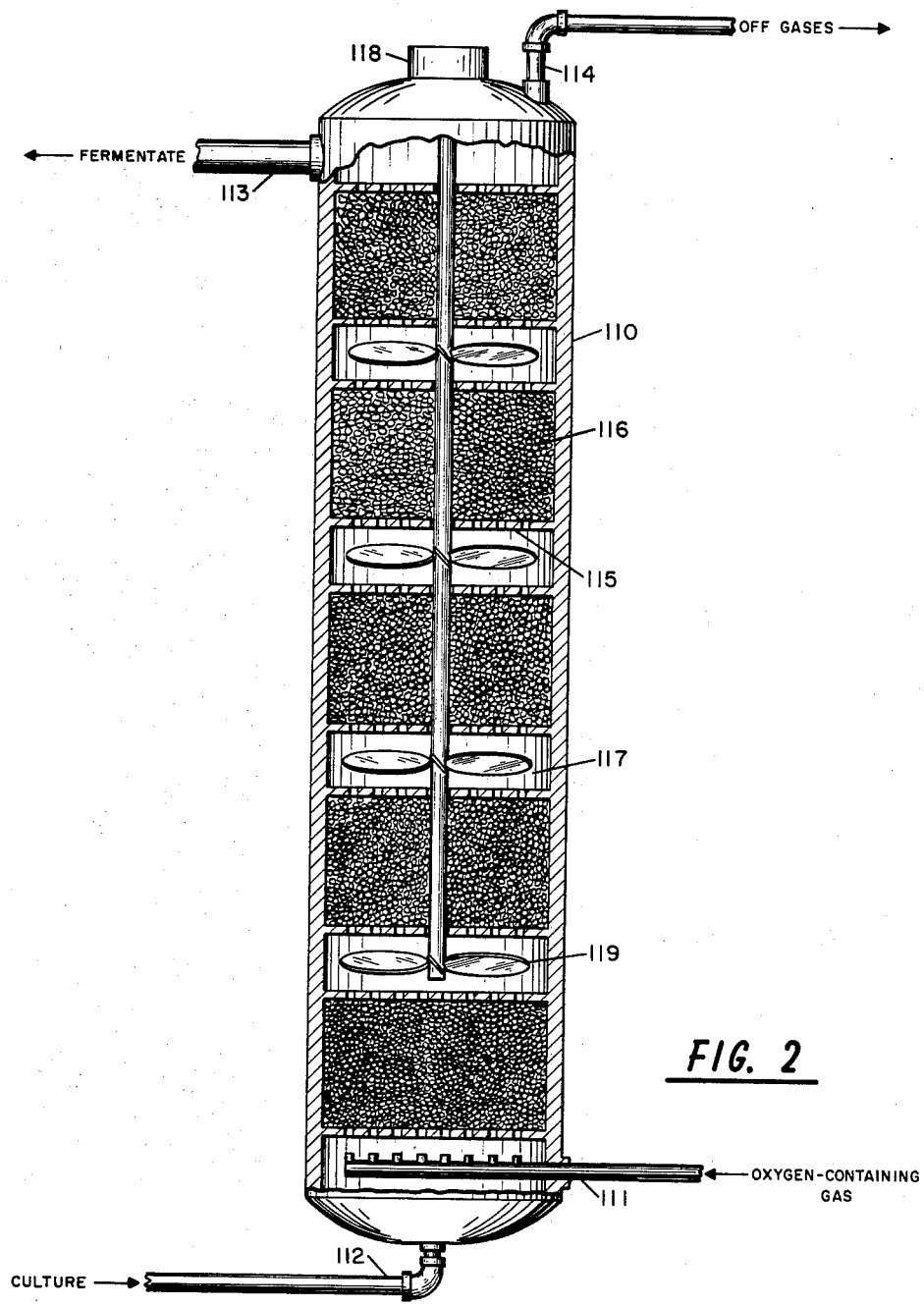

The nature and objects of the invention can best be understood by referring to the following detailed description of a process for the production of heteropolysaccharides by the fermentation of carbohydrates with bacteria of the genus Xanthomonas and to the accompanying drawings, in which:

FIGURE 1 is a flow sheet schematically illustrating one embodiment of the process; and FIGURE 2 schematically illustrates alternate apparatus which may be utilized in practicing the invention.

The plant which is depicted in FIGURE 1 of the drawings includes a feed preparation vessel 11 in which a low carbohydrate culture medium suitable for the growth of bacterial cells is prepared. The substrate employed in the medium is introduced into vessel 11 through line 12 from a source not shown. The substrate utilized may comprise boullion stock, blood serum, yeast extract, meat peptone, malt extract, milk peptone, soy peptone, distiller's solubles or a similar material having a relatively high protein content and a relatively low carbohydrate content. Numerous substrates composed primarily of protein hydrolysis products are marketed commercially for use in culture media and will therefore be familiar to those skilled in the art. Salts such as dipotassium acid phosphate, sodium carbonate, and magnesium sulfate, if used in the medium and not already present in the substrate, may be added through line 13. Experience has shown that many substrates, particularly those marketed commerically for use in culture media, contain all the constituents normally required for satisfactory metabolism of the bacteria and that the addition of salts with the substrate is therefore unnecessary. Water utilized in preparing the culture medium may be added to the system through line 14. Agitator 15 is provided in vessel 11 to assure thorough mixing of the constituents employed.

The finished medium prepared in preparation vessel 11 will normally contain protein hydrolysis products or a similar substrate in a concentration within the range between about 0.1% and about 10% by weight and will ordinarily include less than about 0.5% by weight of carbohydrate. Dipotassium acid phosphate, magnesium sulfate and other salts, if added separately, will generally be employed in concentrations between about 0.1 and about 0.5% by weight. The most effective concentration for a particular fermentation reaction will depend to some extent upon the particular constituents utilized in the medium, the fermentation conditions employed, and the particular type of bacteria with which the fermentation is to be carried out. These concentrations may therefore be varied considerably. Specific formulations on which bacteria of the genus Xanthomonas may be grown satisfactorily include the following: (1) soy peptone—0.7% by weight, magnesium sulfate—0.2% by weight, and glucose—0.2% by weight; (2) Basamin-Busch (a commercial culture material marketed by Anheuser-Busch, Inc., St. Louis, Missouri)—0.5% by weight, magnesium sulfate—0.2% by weight, and glucose—0.2% by weight; and (3) malt extract—0.3% by weight, yeast extract—0.3% by weight, meat peptone—0.4% by weight, magnesium sulfate—0.2% by weight and glucose—0.2% by weight. The percentages given in the above formulations are all based upon the water content of the medium. Other formulations of generally similar composition which may be employed for carrying out the fermentation will readily suggest themselves to those skilled in the art.

The low carbohydrate fermentation medium prepared as described in the preceding paragraph is pumped from vessel 11 through line 16 by means of pump 17 to a sterilization unit 18. An intermediate storage vessel not shown in the drawings may be provided to permit the accumulation of medium and thus facilitate continuous operation if desired. The sterilization unit employed may comprise a heat exchanger, a jacketed vessel, a vat provided with an electrical heater, or similar apparatus within which the medium can be heated to a temperature within the range between about 200° F. and about 275° F. and held at that temperature for a period of from about 2 minutes to about 5 minutes. Higher temperature and longer residence times may be utilized if found necessary to render the medium sterile but in general the temperatures and times indicated will be sufficient to kill any bacteria or spores present. The sterilization unit shown in the drawings comprises a heat exchanger into which steam is introduced through line 19 and from which condensate is withdrawn through line 20.

The hot sterile medium produced in sterilization unit 18 is withdrawn through line 21 at a temperature between about 200° F. and about 275° F. and is passed into a culture vessel 22. In starting up the process shown in FIGURE 1, the medium introduced into vessel 22 initially is allowed to cool to the fermentation temperature between about 70° F. and about 100° F., preferably between about 75° F. and about 85° F. After the plant has been started up and equilibrium has been established, cooling is generally unnecessary. The rate at which the hot medium is introduced from the sterilization unit is generally low so that only localized heating takes place and hence the overall temperature of the fermenting medium in vessel 22 does not change appreciably. A cooling unit not shown in the drawings may be installed between the sterilization unit and the vessel 22 if desired, however. The cooling unit selected may be a jacketed vessel, a vat containing cooling coils or other conventional cooling apparatus which will permit a reduction in temperature without contamination of the medium.

On starting the process for the first time, the medium introduced into vesel 22 is inoculated with a culture containing bacteria of the genus Xanthomonas. Thereafter, bacterial cells are produced continuously so that further inoculation is generally unnecessary. Representative species of the genus Xanthomonas which may be utilized for purposes of the invention include *Xanthomonas begoniae, Xanthomonas campestris, Xanthomonas carotae, Xanthomonas hederae, Xanthomonas incanae, Xanthomonas malvacearum, Xanthomonas oryzae, Xanthomonas papavericola, Xanthomonas phaseoli, Xanthomonas pisi, Xanthomonas translucens, Xanthomonas vasculorum* and *Xanthomonas vesicatoria*. Cultures of these and other xanthomonads are contained in the American Type Culture Collection located in Washington, D.C., and in other repositories. Experimental work has shown that the production of heteropolysaccharides by the fermentation of carbohydrates is a characteristic trait of members of the genus Xanthomonas and that any of a variety of different species can therefore be employed. It has been found, however, that certain species produce the heteropolysaccharides more efficiently than do others and are therefore preferred for purposes of the invention. Species which are particularly effective in this respect include *Xanthomonas begionae, Xanthomonas campestris, Xanthomonas pisi* and *Xanthomonas vesicatoria*.

After the sterile medium initially introduced into vessel 22 has been inoculated with the selected microrganisms, a sterile oxygen-containing gas is introduced into the medium through line 23 in order to provide the aerobic conditions required for satisfactory metabolism of the microorganisms. Air, air enriched in oxygen or substantially pure oxygen may be utilized. In large-scale operations, it is frequently preferred to employ substantially pure oxygen and to recycle the off-gases in order to reduce compression costs but this procedure may be less advantageous in smaller plants. The gas employed may be passed through a bacterial filter, a bactericidal solution or a heating unit in order to kill any microorganisms present therein. It is preferred to introduce the injected gas through a sparger or a similar distribution device 24 located near the bottom of vessel 22. Agitation in addition to that normally supplied by the gas as it bubbles upwardly through the medium may be provided by means of an agitator 25. Under the aerobic conditions thus provided, the bacteria contained in the medium consume the substrate and rapidly multiply. There is relatively little production of heteropolysaccharide during this stage of the process because of the low carbohydrate content of the medium but some polymer will normally be formed.

This polymer production is accompanied by a decrease in the pH of the medium. In order to control this decrease and maintain conditions favorable for the production of bacterial cells at a high rate, the vessel is provided with an electrode assembly or a similar pH measuring equipment indicated by reference numeral 26. This equipment measures the pH of the medium continuously or intermittently and actuates a motor-driven or similarly controlled valve 27 in line 28. Sodium hydroxide, ammonium hydroxide or a similar base is continuously or intermittently injected into vessel 22 through line 28 in a concentration sufficient to counteract the acidity of the medium and maintain the pH at a level between about 6.0 and about 7.5, preferably between about 6.5 and about 7.2. In some cases sufficient buffer can be employed in the medium to control the pH but this latter mode of operation has certain disadvantages and is not generally preferred. As pointed out above, the conditions within vessel 22 are controlled following initial inoculation of the medium with the selected microorganisms in order to assure a continuous supply of medium containing bacterial cells in high concentrations. Off-gases from the vessel, including unconsumed oxygen and carbon dioxide liberated by the microorganisms, are withdrawn overhead through line 29. Medium containing the bacterial cells produced in vessel 22 is withdrawn from the vessel through line 30 and is circulated by means of pump 31 to the polymer-producing stage of the process.

The bacteria or other microorganisms grown as described in the preceding paragraphs are employed for the fermentation of a second medium which is prepared continuously or intermittently in a vat or mixing vessel 35. This vessel is provided with line 36 through which water is introduced into the system, with line 37 for the introduction of the carbohydrate to be employed as a substrate for production of the heteropolysaccharide, and with line 38 through which a bacterial nutrient and salts may be supplied if desired. An agitator 39 is provided in the vessel to facilitate mixing of the ingredients from which the medium is formulated. A variety of carbohydrates can be fermented with the bacterial cells produced in vessel 22 to obtain the heteropolysaccharide. Suitable carbohydrates include glucose, sucrose, fructose, lactose, maltose, galactose, soluble starch, cornstarch, cellulose and the like. The carbohydrate utilized need not be in refined state and hence crude products having a high carbohydrate content, raw sugar or sugar beet juice for example, may be employed. Unrefined carbohydrates of this type are generally less expensive than the corresponding purified materials and are therefore normally preferred for production of the heteropolysaccharide. Distillers' solubles or a similar material containing organic nitrogen compounds and suitable trace elements may be utilized with the carbohydrate in the medium. Dipotassium acid phosphate and in some cases magnesium phosphate may also be employed in the medium.

It is not always essential that a nutrient and salts be added to the medium prepared in vessel 35. Experience has shown that the culture medium transferred to the polymer producing stage of the process from culture vessel 22 often contains sufficient nutrient and salts to permit continued metabolism of the bacteria and production of the heteropolysaccharide, particularly where raw sugar beet juice or a similar crude carbohydrate source material is used. Many such crude materials contain organic nitrogen compounds and trace elements in quantities sufficient for metabolism of the xanthomonads, thus making the separate addition of salts and nutrients unnecessary. The medium utilized will normally contain from about 5% to about 50% by weight of the selected carbohydrate but in some cases significantly higher carbohydrate contents may be employed. The medium may also contain from about 0.01% to about 0.5% by weight of dipotassium acid phosphate and from about 0.1% to about 10% by weight of a suitable nutrient if desired.

The medium utilized in the polymer production stage of the process will normally contain, in addition to the ingredients set forth above, a small amount of agar, gelatin, glue or similar mucilaginous material which is relatively insoluble in aqueous media at the fermentation temperature but can be dissolved at higher temperatures. Care should be taken in selecting a binder material to choose a nontoxic material which has no detrimental effect upon metabolism of the microorganisms employed. The use of from about 0.1% to about 5.0% of agar is preferred. This may be added to the medium in vessel 35 through line 40 as shown in FIGURE 1 or may be separately added later. The method employed will depend upon the sterilization technique utilized. The system depicted in FIGURE 1 is an intermittent system in which the medium is prepared in batches and sterilized in vessel 35 as needed. A jacket, cooling coil or similar means for raising the medium to a sterilization temperature of about 200° F. and about 275° F. or higher and holding it at that temperature for a period of from about 2 minutes to about 5 minutes or longer is provided. The system depicted includes a jacket into which steam is introduced through line 41 and from which condensate is withdrawn through line 42. Here the agar or other mucilaginous material may be introduced into the medium within the vessel during the sterilization step. In other cases, it may be preferred to provide a separate sterilization unit and separately introduce the mucilaginous material after the medium has been brought to elevated temperature. If a continuous system for preparing the medium is employed, an accumulation vessel not shown may be provided between the mixing vessel 35 and the sterilization unit in order to assure continuous flow. The use of such a vessel will be apparent to those skilled in the art.

The polymer producing stage of the process depicted in FIGURE 1 of the drawings comprises columns 50, 51 and 52 containing solids on which the medium utilized by the microorganisms for production of the polymer is supported. A variety of different supporting material on which the medium can be adsorbed or within which it can be absorbed will be satisfactory. Suitable materials include berl saddles, raschig rings, porous ceramic discs, foamed polymer particles, polyurethane members and the like. In the embodiment shown in FIGURE 1, each column is substantially filled with the supporting material to form a single reaction zone. The solids may be coated with the medium prior to fermentation by circulating hot medium from vessel 35 through lines 54 by means of pump 55. The columns are provided with inlets 56, 57 and 58 containing valves 59, 60 and 61 so that the medium can be introduced into each column separately. The hot medium thus circulated forms a film on the surface of the supporting solids within the columns as it cools and the agar, gelatin or other mucilaginous material contained therein solidifies. Excess medium is removed from the columns through outlet lines 62, 63 and 64 containing valves 65, 66 and 67 and is returned to mixing vessel 35 by means of pump 68 and line 69. The lines used for circulation of the medium may be traced with steam through lines not shown to avoid accumulations outside the columns. An alternate system is to remove the solids from the columns at periodic intervals and recoat them with the medium employed for production of the heteropolysaccharide outside the columns.

The culture medium produced in vessel 22 is introduced into the fermentation columns through manifold 70 and supply lines 71, 72 and 73 containing valves 74, 75 and 76. In like manner, oxygen necessary for metabolism of the bacteria in the columns is introduced from manifold 77 through lines 78, 79 and 80 containing valves 81, 82 and 83. Spargers, nozzles, or similar distribution devices 84, 85 and 86 are provided near the lower end of each column to distribute the gas and reduce channeling. Again either air, gas enriched in oxygen or substantially pure oxygen may be utilized. Baffles, disc and doughnut plates, or similar means may be located within the packed sections of the columns in order to further improve distribution of the gas and culture medium and reduce channeling if desired. The exhaust gases, including unconsumed oxygen and carbon dioxide liberated by the bacteria, are withdrawn overhead from the columns through lines 87, 88 and 89 containing valves 90, 91 and 92. These gases are passed through a manifold 93, combined with the exhaust gases from vessel 22 in line 29, and introduced into a combustion chamber 94. Here methane, natural gas or a similar fuel added through line 95 is burned with a suitable nozzle. Combustion of the fuel in the presence of the off-gases from the fermentation vessel results in the incineration of bacteria present in the gas stream. Solid or liquid fuels may be utilized in lieu of a gaseous fuel if desired. The gases thus sterilized are discharged from the system through line 96. As pointed out earlier, an alternate method of operation is to collect the gases from the fermentation vessels, treat them for the removal of carbon dioxide, enrich them in oxygen, and recycle them through the system.

As the culture medium from vessel 22 passes upwardly through the interstices between the solids in the fermentation columns, the carbohydrate contained on the solids slowly diffuses or dissolves into the liquid phase and thus becomes available to the bacteria present in the bulk liquid. The solids are exposed to high carbohydrate concentration near the solid surfaces and to low carbohydrate, high nutrient concentrations in the liquid. This permits the production of heteropolysaccharide by the cells near the surfaces and yet avoids excessively high carbohydrate concentrations that may otherwise have adverse effects on cell metabolism. Experimental work has shown that solutions containing 40% or more sugar can be coated on the solids and used without ill effects; whereas sugar concentrations in excess of about 10% may produce adverse effects if used in other systems. The flow rate of the culture medium introduced into the columns should be controlled to give column residence times on the order of from about 8 to about 36 hours. Between about 12 and about 24 hours are generally preferred with the xanthomonads. Greater or lesser periods may be more advantageous with other organisms. The ability to control the residence time more closely than is generally possible in other systems constitutes a pronounced advantage of this particular system because it reduces washout of active cells and permits better utilization of the cell nutrients than might otherwise be obtained. Fermentation rates are normally higher than in other systems.

A further advantage of the system shown in the drawings lies in the better carbohydrate conversion obtained. Tests have shown that 80% or more of the carbohydrate introduced into the column can be converted into heteropolysaccharide by proper control of the residence time and other variables; whereas conversion is normally about 50% in conventional systems. Moreover, the controlled diffusion of the sugar or other carbohydrate into the bulk liquid phase increases the quantity of polymer which can be produced per unit volume and results in higher final polymer concentrations than are normally obtained in stirred reactors and the like. In systems of the latter type, final concentrations are generally between about 1 and about 2%; while concentrations of 4% or higher are possible with the system of the invention. This difference in concentrations is significant because it reduces the volume of water which must be removed from the fermentate and simplifies purification of the polymer.

The heteropolysaccharide synthesized by the bacteria is picked up by the medium as it moves through the columns. The fermentate thus produced is withdrawn from the columns through outlet lines 97, 98 and 99 containing valves 100, 101 and 102 and is discharged through line 103. This fermentate may be sterilized to kill the bacteria present therein by adding formaldehyde, a chlorinated phenolic compound or a similar bactericide or by heating the fermentate to a high temperature during a subsequent drying step. The system employed will depend upon the intended end use of the polymer. Where the heteropolysaccharide is to be employed in oilfield drilling muds and similar applications, it is generally satisfactory to precipitate the polymer from the fermentate by adding an organic solvent such as methanol, ethanol or acetone and an electrolyte such as a sodium chloride or potassium chloride solution; by adding a quaternary ammonium compound; or by supplying divalent cations at high pH values. The precipitated solids can then be dried by means of a conventional rotary dryer, tunnel dryer or similar equipment. Where the polymer is to be employed in food products or pharmaceuticals and a purified material is required, it may be preferable to first separate the bacterial cells from the fermentate by filtration or centrifugation and then precipitate the polymer from solution several times in order to remove any traces of the fermentate and other impurities. Conventional drying methods can again be used. The dried product is normally obtained as a finely divided powder having a slight yellowish tint.

As pointed out previously, the columns or other vessels utilized in carrying out the process of the invention are preferably operated to permit continuous production of the heteropolysaccharide. This can be done by staggering the times at which fermentation is commenced in the columns so that two columns are operating while a third is being regenerated with the high carbohydrate medium. Column 50 may be regenerated, for example, by closing valves 74, 81, 90 and 100 and opening valves 59 and 65 to permit circulation of hot medium to the column from vessel 35. During this period, fermentation is continued in columns 51 and 52 by leaving valves 60, 61, 66 and 67 closed and keeping valves 75, 76, 82, 83, 88, 89, 100, 101 and 102 open. By scheduling the operation of each column or vessel properly, fermentation can thus be carried out on a continuous basis.

FIGURE 2 of the drawings illustrates an alternate form of apparatus which may be utilized in carrying out the process. In lieu of employing a column or columns containing a single reaction zone, staged columns containing multiple zones may be used. The staged column shown in FIGURE 2 includes an outer shell 110 provided with an oxygen inlet and associated sparger or similar device 111 and a culture inlet 112 near its lower end and with a polymer outlet 113 and exhaust gas outlet 114 near its upper end. The interior of the column is separated into vertically-spaced zones by means of perforated plates or similar means 115. Alternate zones 116 defined by the plates are filled with porous solids of irregular shape on which the high carbohydrate medium utilized for production of the heteropolysaccharide is coated. Manholes not shown are provided for the removal and recoating of these solids as necessary. The intervening zones 117 are mixing zones within which the culture medium is agitated. An agitator 118 including blades or impellors 119 in each mixing zone is provided to assure adequate mixing. A separate agitator for each zone in lieu of the single device shown may be provided if desired. Experimental work has shown that intense mixing of the liquid phase at periodic intervals in a column or similar vessel such as that shown in FIGURE 2 improves the efficiency with which the bacteria convert the carbohydrate into heteropolysaccharide, reduces the required residence time and generally permits better polymer yields. It will be understood that the system is not limited to the precise apparatus depicted in FIGURE 2, however, and that a greater or lesser number of mixing zones and contacting zones may be employed. These and other modifications of the apparatus utilized will be readily apparent to those skilled in the art.

The process of the invention is not limited to the production of heteropolysaccharides by the action of bacteria of the genus Xanthomonas or carbohydrates and can instead be employed for carrying out other fermentation reactions, particularly reactions in which the concentrations of the fermentation medium must be controlled carefully in order to avoid adverse effects on cell metabolism. Typical of such fermentations are those used for the production of yeast, those employed to produce microbial cells having a high protein or fat content for use as animal or human food supplements, and those utilized to produce high molecular weight materials from the action of *Leuconostoc mensenteroides, Chromobacterium violacium, Aerobacter aerogenes, Rhizobium trifolii* and other organisms on suitable substrates. Certain minor modifications in the preliminary steps used to prepare the media and the conditions under which the equipment is operated may be necessary in certain of these fermentations but such modifications will be readily apparent to those skilled in the fermentation art.

What is claimed is:

1. A process for the production of a polysaccharide which comprises:
    (a) growing microorganisms capable of converting carbohydrates into polysaccharides on a protein-containing growth medium in a first zone, said growth medium containing insufficient carbohydrate to permit the formation of substantial quantities of polysaccharide in said first zone;
    (b) passing growth medium containing viable micoorganisms from said first zone through a fixed bed of solids in a second zone, said solids being coated with an adherent film containing at least about 5 weight percent of a carbohydrate diffusible into said growth medium from said film;
    (c) controlling conditions in said second zone and the residence time of the medium therein to permit the conversion of carbohydrate into polysaccharide by said microorganisms as said carbohydrate diffuses into said growth medium; and,
    (d) withdrawing medium containing microorganisms and polysaccharide produced by said microorganisms from said second zone.

2. A process as defined by claim 1 wherein said microorganisms are bacteria of the genus Xanthomonas.

3. A process as defined by claim 1 wherein said film contains agar as a binder.

4. A process as defined by claim 1 wherein said growth medium is passed through a series of fixed beds in said second zone and is agitated as it passes from one bed to the next.

5. A process for the production of a heteropolysaccharide which comprises:
    (a) growing bacteria of the genus Xanthomonas on a protein-containing growth medium in a first zone, said growth medium containing less than about 0.5 weight percent of carbohydrate;
    (b) passing growth medium containing live xanthomonads from said first zone through a fixed bed of inert solids in a second zone, said solids being coated with an adherent film containing at least about 5 weight percent of a carbohydrate substrate diffusible into said growth medium from said adherent film;
    (c) supplying oxygen to said second zone and controlling the temperature and pH conditions therein to permit the production of heteropolysaccharide from said carbohydrate substance by the xanthomonads as said substance diffuses into said growth medium from said film;
    (d) controlling the flow rate of medium into said second zone to maintain a residence time on the order from about 8 to about 36 hours;
    (e) withdrawing medium containing xanthomonads and heteropolysaccharide produced by said xanthomonads from said second zone.

6. A process as defined by claim 5 wherein said bacteria are *Xanthomonas campestris*.

7. A process as defined by claim 5 wherein said substrate is raw sugar.

8. A process as defined by claim 5 wherein said film contains from about 5 to about 50 percent of carbohydrate by weight.

9. A process as defined by claim 5 wherein said bacteria are *Xanthomonas vesicatoria.*

References Cited by the Examiner

UNITED STATES PATENTS

| | | | |
|---|---|---|---|
| 1,074,814 | 10/1913 | Pohl | 195—33 |
| 1,937,672 | 12/1933 | Sherman | 195—116 |
| 2,146,326 | 2/1939 | Bergius et al. | 195—116 |
| 2,813,821 | 11/1957 | Updegraff | 195—116 |
| 2,904,474 | 9/1959 | Forg | 195—103.5 |
| 2,912,309 | 11/1959 | Free | 195—103.5 |
| 3,015,612 | 1/1962 | Pirt et al. | 195—142 |
| 3,020,206 | 2/1962 | Patton et al. | 195—31 |
| 3,094,466 | 6/1963 | Schwartz | 195—103.5 |

FOREIGN PATENTS

| | | |
|---|---|---|
| 490,697 | 2/1953 | Canada. |

A. LOUIS MONACELL, *Primary Examiner.*

A. E. TANENHOLTZ, *Assistant Examiner.*